R. T. NEWTON.
BUMPER.
APPLICATION FILED DEC. 12, 1916.
1,343,740.
Patented June 15, 1920.
2 SHEETS—SHEET 1.
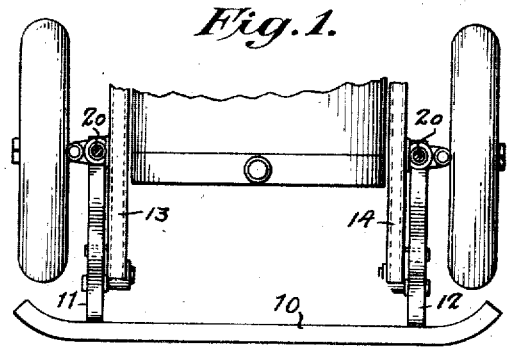
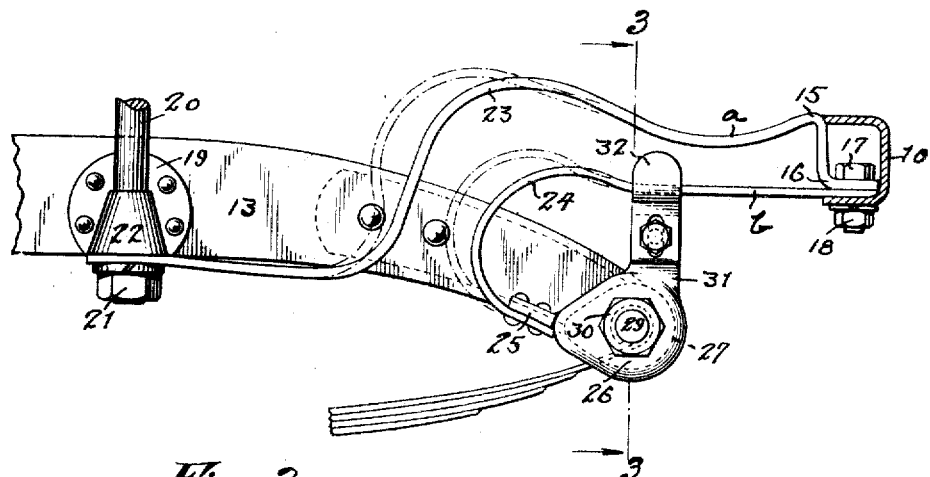
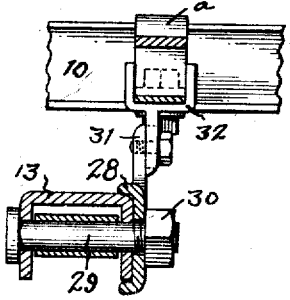
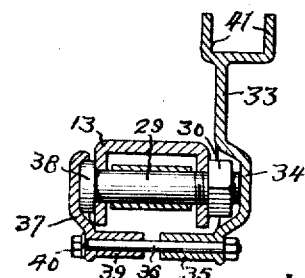
Attest:
Inventor:
RICHARD T. NEWTON
by
Attys.

R. T. NEWTON.
BUMPER.
APPLICATION FILED DEC. 12, 1916.
1,343,740.
Patented June 15, 1920.
2 SHEETS—SHEET 2.
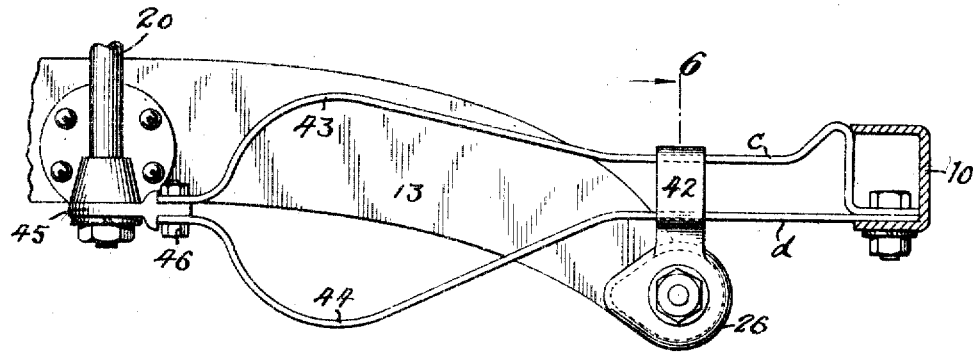
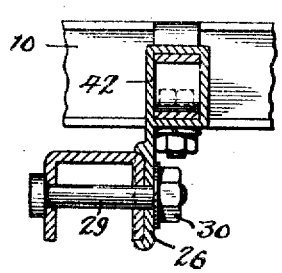 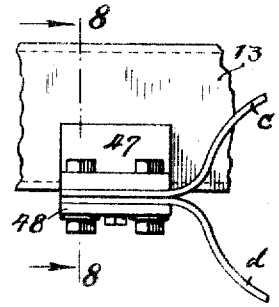 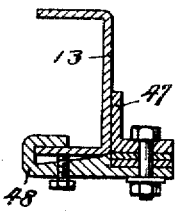
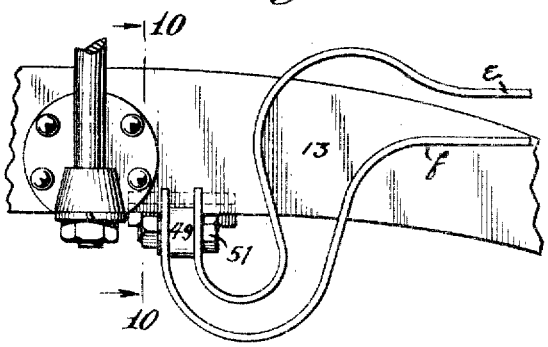 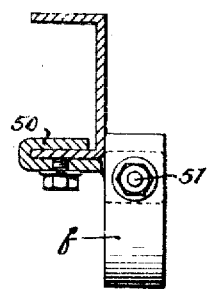
Inventor:
RICHARD T. NEWTON

UNITED STATES PATENT OFFICE.

RICHARD T. NEWTON, OF NEW YORK, N. Y.

BUMPER.

1,343,740.　　　　Specification of Letters Patent.　　Patented June 15, 1920.

Application filed December 12, 1916. Serial No. 136,475.

*To all whom it may concern:*

Be it known that I, RICHARD T. NEWTON, a citizen of the United States of America, and residing in the city, county, and State of New York, have invented a certain new and Improved Bumper, of which the following is a specification.

My invention relates to bumpers and particularly to bumpers for automobiles, the object of my invention being to provide a bumper of improved construction which may be readily installed without injury to any portion of the autombile frame and which is light, strong and efficient.

Referring to the accompanying drawing,

Figure 1 is a plan view of the front portion of a chassis showing a bumper in which my invention is embodied in one form;

Fig. 2 is a side elevation of one of the bumper supporting arms drawn to a larger scale;

Fig. 3 is a section through the chassis frame on the line 3—3, Fig. 2;

Fig. 4 is a section on the same line through a modified construction;

Fig. 5 is a side elevation of a supporting arm of modified construction;

Fig. 6 is a cross section of one of the guide brackets shown in Fig. 5;

Fig. 7. is a side elevation of a modified attaching bracket;

Fig. 8 is a cross section on line 8—8, Fig 7;

Fig. 9 is a partial elevation of another modification of the supporting arm; and Fig. 10 is a section on line 10—10, Fig. 9.

In the construction illustrated in Figs. 1 to 3, the bumper bar 10, which is here shown by way of example as of channel section, is supported by spring arms 11 and 12 extending from the side bars 13 and 14 of the chassis. Each arm comprises an upper spring strap $a$ and a lower spring strap $b$. These straps may be integral, but preferably are independent of each other, as shown, so that the longer upper strap $a$ may be of heavier material than the lower strap $b$. The forward end of the strap $b$ lies against the bottom flange of the bar 10, while the forward end of the strap $a$ is bent to form a knuckle 15 abutting the upper flange of the bar 10 and is further offset at 16 to overlie the forward end of the strap $b$. A bolt 17, passing through the two straps and the lower flange of the bar 10 and provided with the nut 18, clamps the spring arm rigidly to the bumper bar.

The upper strap $a$ is carried back to a suitable abutment on the side bar 13 of the chassis. In the present construction I have utilized as this abutment the bracket 19 and the rod 20 which are commonly provided as a support for the front wheel mud guards. The rear end of the strap $a$ is perforated to pass over the threaded lower end of the rod 20 and is clamped by the nut 21 between the latter and the bracket eye 22. Between its ends a spring bend 23 is imparted to the strap $a$ to permit the latter to yield oh impact against the bumper bar.

The lower strap $b$ is carried in a spring loop 24 backward and downward to a lug 25 on a bracket 26, and is riveted thereto. The bracket 26 fits over the usual egg-shaped protuberance 27 at the forward end of the chassis bar 13 and grips the latter with its side flanges 28. It is centrally perforated to pass over the spring bolt 29 and is clamped upon the boss 27 by screwing up the usual nut 30 on the spring bolt.

In order to steady the supporting arm and prevent its vibration on ordinary road travel, the bracket 26 is provided with an upwardly extending arm 31 carrying a vertically adjustable channel guide 32 in which lies the lower strap $b$. The curvature of the bend 24 in the latter is such that the forward portion of the strap $b$ is constantly pressed downward against the bottom of the guide 32 so that there is no looseness or rattling of the parts under ordinary conditions. The vertical adjustability of the guide 32 permits the bumper bar to be properly positioned with relation to the chassis frame in spite of various curvatures for the front ends of the side bars 13 and 14.

Upon impact against the buffer bar the springs $a$ and $b$ yield in a vertical plane, as shown, and the spring curves 23 and 24 take positions substantially as shown in broken lines in Fig. 2.

Instead of mounting the guide bracket 26 on the bolt 29, as in Figs. 2 and 3, I may clamp it over the bolt heads as indicated in Fig. 4. In this case the bracket 33 is provided with a recess 34 which fits over the nut 30 of the spring bolt 29 and is carried below the channel 13 in the form of a sleeve 35 through which passes a clamping bolt 36. A coöperating clamp 37 fits over the head 38 of the spring bolt and is in turn provided with a sleeve 39 through which the draw-up bolt 36 also passes. When the nut 40 is screwed up the two portions of the clamp are drawn together over the opposite ends of the bolt and afford a very secure support for the guide channel 41. In the present construction the adjustable feature of the latter has been omitted, but obviously could be made the same at this point, as shown in Fig. 3.

In the construction shown in Fig. 5 the springs straps c and d are secured in the same manner as before to the bumper bar 10, but both extend straight rearwardly through the closed guide eye 42 and are symmetrically bowed apart at 43 and 44 to form spring loops, flexing in opposite directions in the same vertical plane. Their rear ends are perforated and brought together on opposite sides of a shouldered washer 45 secured to the mud guard bracket and to which they are clamped by the bolt 46. The springs loops press the forward ends of the straps c and d against the upper and lower sides of the guide eye 42 and thus keep the arm from rattling.

In Figs. 7 and 8 I have shown the rear ends of the spring straps c and d bolted to a clamp 47 the jaw 48 of which engages the lower flange of the chassis side bar. The thrust of the bumper is thus transmitted to the chassis quite as directly as through the mud guard bracket and the construction has the advantage of being available for attachment at any suitable point on the chassis and particularly in cars which have no available mud guard bracket.

In Figs. 9 and 10 I have shown a further modified attachment device for straps of the general character shown in Fig. 2. In this instance both straps e and f are carried back to a common point of attachment on the chassis. The spring ends are carried down below the chassis and recurved upward so that they pass substantially vertically through the clamping device 49. The latter is secured to the chassis side bar by a jaw 50 and the spring ends are held by a transverse bolt 51.

The constructions shown all involve the common thought of spring straps flexing in a vertical plane and extending between the bumper bar in front to a point of attachment in the rear rigid with the chassis, and in certain constructions having a common point of attachment. No injury to the chassis frame is involved in the attachment. The supporting arm is itself the spring, so that posts, sockets, etc., of the type commonly found in bumpers using coil springs, are avoided and the device thus cheapened as well as lightened. The channel section bar, while not essential, is desirable because of its combined strength and light weight, thus minimizing danger of fracture from sudden shocks due to rough road conditions, a danger which is particularly great in bumpers of the horizontally yielding leaf spring type. The present device combines strength, light weight and ample resiliency for bumper requirements. I do not limit my invention to the particular spring curvatures shown or to the particular methods of attachment, which may be variously modified without departing from what I claim as my invention.

I claim as my invention:—

1. An automobile bumper comprising a transverse bumper bar and a pair of spring arms extending between the same and the chassis, each of said spring arms comprising a pair of vertically flexible, spring straps spaced apart in the same plane.

2. An automobile bumper comprising a transverse bumper bar and a pair of spring arms extending between the same and the chassis, each of said spring arms comprising a pair of vertically flexible, spaced, spring straps.

3. An automobile bumper comprising a transverse bumper bar and a pair of spring arms extending between the same and the chassis, each of said spring arms comprising a vertically flexible spring strap and a guide engaging the same between its ends to hold the same against vibration.

4. An automobile bumper comprising a transverse bumper bar and a pair of spring arms extending between the same and the chassis, each of said spring arms comprising a pair of vertically flexible spring straps and a guide engaging both of said straps between their ends to hold the same against vibration.

5. An automobile bumper comprising a transverse bumper bar and a pair of spring arms extending between the same and the chassis, each of said spring arms comprising a pair of spring straps and a guide through which said straps pass and in which they are held against vibration by their own resiliency.

6. An automobile bumper comprising a transverse bumper bar and a pair of spring arms extending between the same and the chassis, each of said spring arms comprising a pair of vertically flexible spring straps, and an associated closed guide through which said straps pass and in which they are held against vibration by their own resiliency.

7. An automobile bumper comprising a transverse bumper bar and a pair of spring arms extending between the same and the chassis, each of said spring arms comprising a spring strap, and an associated guide mounted at the front end of a chassis side bar for supporting said spring arm against vibration.

8. An automobile bumper comprising a transverse bumper bar and a pair of spring arms extending between the same and the chassis, each of said spring arms comprising a spring strap, and an associated guide clamped at the front end of a chassis side bar for supporting said spring arm against vibration.

9. An automobile bumper comprising a transverse bumper bar, and a pair of spring arms extending between the same and the chassis, each of said arms comprising a spring strap, and a guide through which said strap passes with freedom of longitudinal displacement said guide serving to hold the arm against vibration.

10. An automobile bumper comprising a transverse bumper bar, and a pair of spring arms extending between the same and the chassis, each of said arms comprising a vertically flexible spring strap and a guide through which said strap passes with freedom of longitudinal displacement said guide serving to hold the arm against vibration.

11. An automobile bumper comprising a transverse bumper bar and a pair of spring arms extending between the same and the chassis, each of said arms comprising a pair of spring straps lying in substantially the same vertical plane and oppositely bowed to flex in said plane.

12. An automobile bumper comprising a transverse bumper bar and a pair of spring arms extending between the same and the chassis, each of said arms comprising a pair of spring straps lying in substantially the same vertical plane and oppositely bowed to flex in said plane, together with a guide through which said straps freely pass, said guide serving to hold the arm against vibration.

13. An automobile bumper comprising a transverse bumper bar, and a pair of spring arms extending between the same and the chassis, each of said arms comprising a pair of spring straps the forward portions of which are substantially straight and parallel and the rear portions of which are spaced apart and bowed to afford flexion in a vertical plane.

14. An automobile bumper comprising a transverse bumper bar, and a pair of spring arms extending between the same and the chassis, each of said arms comprising a pair of spring straps the forward portions of which are substantially straight and parallel and the rear portions of which are bowed to afford flexion in a vertical plane, together with a guide through which the forward portion of the arms pass to hold the same against vibration.

15. An automobile bumper comprising a transverse bumper bar, and a pair of spring arms extending between the same and the chassis, each of said arms comprising a pair of spring straps the forward portions of which are substantially straight and parallel, and the rear portions of which are oppositely bowed to afford flexion in a vertical plane.

16. In an automobile bumper device for a chassis having a side bar with a lateral protuberance at its end, a supporting bracket comprising a plate adapted to fit over said lateral protuberance and pierced to accommodate the spring bolt passing through the side frame, said plate being adapted to be held in position by a nut on said spring bolt.

17. An automobile bumper comprising a transverse bumper bar and a spring arm for supporting the same, said arm comprising a pair of straps arranged in substantially the same vertical plane and having a strut portion extending rearward from the bumper bar, and a curved flexible portion to the rear of said strut portion adapted to yield in said vertical plane.

18. An automobile bumper comprising a transverse bumper bar and a spring arm for supporting the same, said arm including a pair of vertically spaced straps each having a strut portion attached to the bumper bar and a curved flexible portion to the rear thereof, yieldable in a vertical plane.

19. An automobile bumper comprising a transverse bumper bar and a spring arm for supporting the same, said arm comprising a pair of vertically spaced straps each having a strut portion extending rearward from the bumper, and a curved spring portion to the rear of said strut portion and an abutment for said spring arm on the chassis side bar to the rear of its front end.

20. An automobile bumper comprising a transverse bumper bar and a spring supporting arm therefor comprising a pair of straps having strut portions extending forward of the chassis to the bumper, and having curved portions to the rear of said strut portions and a common abutment for said straps at a point to the rear of the front end of the chassis side bar.

21. In combination with a chassis side bar having a downwardly curved end, a transverse bumper bar and a spring arm supporting the same, said spring arm including a strap having a strut portion engaging the bumper bar and a curved flexible portion to the rear thereof, together with an abutment for said spring arm secured to said chassis side bar at a point at the rear of the curved front end in combination with guide means for the strut portion of the arm.

22. In an automobile bumper, a transverse bumper bar and a spring arm therefor comprising a pair of vertically spaced straps yielding in a vertical plane and having an abutment at the side of, and at the rear of, the front end of the chassis side bar, said abutment being secured to said side bar at a point below the upper flange thereof.

23. In an automobile bumper a transverse bumper bar and a spring arm therefor yielding in a vertical plane and having an abutment at the side of, and at the rear of, the front end of the chassis side bar, said abutment comprising a clamping device secured solely to the lower flange of a side bar of channel section.

24. In an automobile bumper, a transverse bumper bar and a spring arm therefor yielding in a vertical plane and having an abutment at the side of, and at the rear of, the front end of the chassis side bar, said abutment comprising a clamp for the end of the spring arm and hook means engaging the lower flange of the chassis side bar and serving as the sole means for holding said clamp in position on the chassis side frame.

In testimony whereof I have signed my name to this specification, in the presence of two subscribing witnesses.

RICHARD T. NEWTON.

Witnesses:
SAMUEL H. SHAW,
GEORGE J. SATEL.